(12) United States Patent
Kalbag et al.

(10) Patent No.: US 10,767,375 B2
(45) Date of Patent: Sep. 8, 2020

(54) MECHANISM TO SECURE THE BASE OF A POLE TO THE LID OF A FLAT BOX FINISHER

(71) Applicants: Anirudh Kalbag, Forest Park, IL (US); Robert Payne, Forest Park, IL (US)

(72) Inventors: Anirudh Kalbag, Forest Park, IL (US); Robert Payne, Forest Park, IL (US)

(73) Assignee: DRYWALL MASTER TOOLS, INC., Westchester, IL (US)

( * ) Notice: Subject to any disclaimer, the term of this patent is extended or adjusted under 35 U.S.C. 154(b) by 636 days.

(21) Appl. No.: 15/494,862

(22) Filed: Apr. 24, 2017

(65) Prior Publication Data

US 2017/0306635 A1    Oct. 26, 2017

Related U.S. Application Data

(60) Provisional application No. 62/327,104, filed on Apr. 25, 2016.

(51) Int. Cl.
| | |
|---|---|
| *E04F 21/00* | (2006.01) |
| *E04F 21/24* | (2006.01) |
| *B25G 3/38* | (2006.01) |
| *E04F 21/165* | (2006.01) |
| *F16B 5/06* | (2006.01) |

(52) U.S. Cl.
CPC .............. *E04F 21/241* (2013.01); *B25G 3/38* (2013.01); *E04F 21/1652* (2013.01); *F16B 5/0664* (2013.01)

(58) Field of Classification Search
CPC ... E04F 21/1652; E04F 21/241; E04F 21/244; E04F 21/06; E04F 21/08; E04F 21/165; F16B 5/0032; F16B 5/06; F16B 5/0664; B25G 3/38
See application file for complete search history.

(56) References Cited

U.S. PATENT DOCUMENTS

| | | | | |
|---|---|---|---|---|
| 266,600 | A * | 10/1882 | Blayney ............. | E05B 65/0864 292/57 |
| 1,564,293 | A * | 12/1925 | Sturgis .................... | B25G 3/38 403/189 |
| 2,406,315 | A * | 8/1946 | Blocher ................... | B64C 1/06 403/387 |

(Continued)

FOREIGN PATENT DOCUMENTS

| | | | | |
|---|---|---|---|---|
| WO | WO-2005039374 A1 * | 5/2005 | ............. | A47L 13/11 |
| WO | WO-2009064238 A1 * | 5/2009 | ............. | A47L 13/20 |

*Primary Examiner* — Matthew R McMahon
(74) *Attorney, Agent, or Firm* — Justin Lampel

(57) ABSTRACT

A mechanism to secure the base of a pole to the lid of a flatbox finisher is provided. The mechanism utilizes at least one spring grasping device on the lid of the flat box finisher to grasp and secure the base of the pole. The grasping mechanism is depressed and grasps a generally flat rectangular edge of the base of the pole and secures the base of the pole to the lid of the flatbox finisher by friction. In particular, as the base having the pole of the flatbox finisher is first slid over the grasping mechanism, the grasping mechanism is first pushed downward. After the base slides over the grasping mechanism, the grasping mechanism springs back upward and locks the base of the pole into place on the lid of the flatbox finisher.

4 Claims, 8 Drawing Sheets

(56) References Cited

U.S. PATENT DOCUMENTS

| | | | | |
|---|---|---|---|---|
| 2,580,495 | A * | 1/1952 | Woods | F16B 5/06 24/654 |
| 2,869,694 | A * | 1/1959 | Breckheimer | E04B 1/5831 52/658 |
| 4,127,911 | A * | 12/1978 | Cupp | B05C 17/00 15/144.1 |
| 4,155,140 | A * | 5/1979 | Janssen | B05C 17/00 15/145 |
| 4,194,852 | A * | 3/1980 | Cupp | B05C 17/00 15/145 |
| 5,010,615 | A * | 4/1991 | Carter | A47L 13/17 15/104.94 |
| 5,347,691 | A * | 9/1994 | Terazoe | B60R 13/0206 24/289 |
| 5,371,917 | A * | 12/1994 | Hoagland | A47L 13/257 15/118 |
| 5,632,569 | A * | 5/1997 | Szmansky | E01C 19/43 15/235.4 |
| 6,554,327 | B1 * | 4/2003 | Riley | E05C 1/04 220/326 |
| 7,856,691 | B2 * | 12/2010 | Viggiani | B05C 1/06 15/118 |
| 8,166,597 | B2 * | 5/2012 | Levitt | A47L 13/256 15/118 |
| 8,438,687 | B2 * | 5/2013 | Cybulski | A47J 37/0786 15/111 |

\* cited by examiner

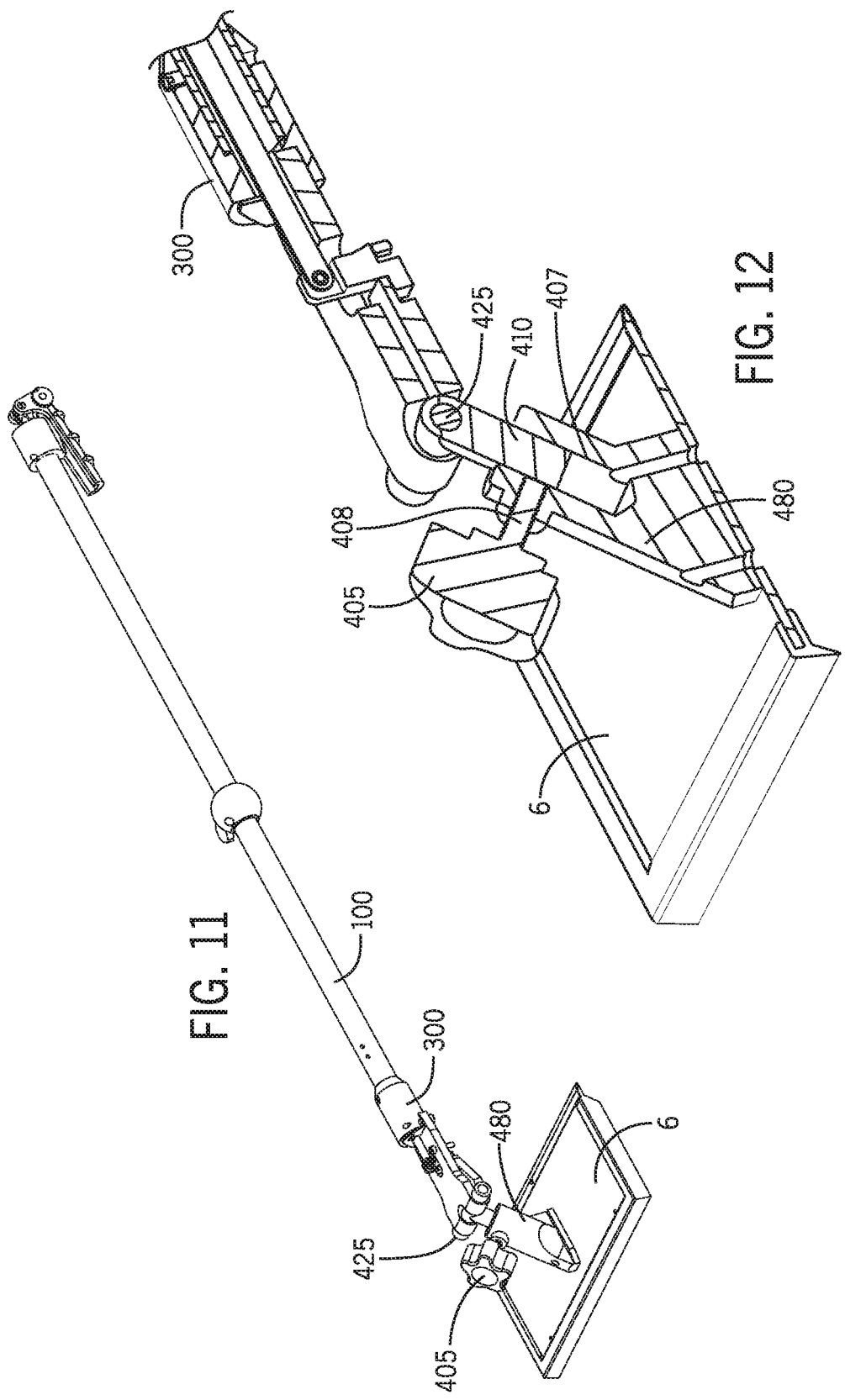

MECHANISM TO SECURE THE BASE OF A POLE TO THE LID OF A FLAT BOX FINISHER

CROSS-REFERENCE TO RELATED APPLICATIONS

The following application is based on and claims the priority benefit of U.S. provisional application Ser. No. 62/327,104 filed Apr. 25, 2016 currently co-pending; the entire contents of which are incorporated by reference.

BACKGROUND OF THE INVENTION

A system and mechanism to secure the base of a pole to the lid of a flatbox finisher is provided. The mechanism utilizes at least one spring grasping device on the lid of the flat box finisher to grasp and secure the base of the pole. The grasping mechanism is depressed and grasps a generally flat rectangular edge of the base of the pole and secures the base of the pole to the lid of the flatbox finisher by friction. In particular, as the base having the pole of the flatbox finisher is first slid over the grasping mechanism, the grasping mechanism is first pushed downward. After the base slides over the grasping mechanism, the grasping mechanism springs back upward and locks the base of the pole into place on the lid of the flatbox finisher. Wing nuts may then be used to further secure the base of the pole to the lid of the flatbox finisher. An alternative embodiment, a knob located on a receiving cylinder of the lid of the flat box finisher receives a pin of the handle portion of the flat box finisher and secures the pin (and therein the handle portion) to the flat box finisher.

Flat box finishers have been around for a long time. For example, U.S. Pat. No. 7,318,716 to Castagnetta discloses a tool for applying mastic to drywall, having a flexible trowelling bar for smoothing and shaping the applied mastic. The curvature of the trowelling bar is controlled by the rotation of a cam that is positioned on a rigid support and that is directly coupled to the trowelling bar through a link. Springs are positioned between the rigid support and the trowelling bar to maintain tension on the link during rotation of the cam. The springs exert pressure on the trowelling bar through plungers having rounded feet that maintain consistent contact with the trowelling bar as the curvature of the trowelling bar changes.

U.S. Pat. No. 6,146,039 to Pool discloses a mud box having a bottom surface with an outlet orifice, sides, a cover pivotally attached along one edge, and a handle attached to the cover for positioning the box on a surface and applying extruding pressure to the cover for ejecting material through the orifice. A spring assembly is attached to the box and connected to apply extruding pressure to the cover. A primary lock is coupled to the spring assembly and the box, the primary lock has a locked position in which the spring assembly is prevented from applying extruding pressure to the cover and an unlocked position in which the spring assembly applies extruding pressure to the cover. The primary lock is activated by a wheel assembly which moves it into the locked position when the box and wheel assembly are disengaged from a surface and which moves it into the unlocked position when the wheel assembly and box are engaged with a surface.

U.S. Pat. No. 5,143,264 to MacMillan discloses a flat finishing box having attachable/detachable heads each of which have a structural part incorporating a mouth and to which an edge assembly and edge assembly adjustment apparatus are attached. Heads are provided for dispensing mud in each of the three standard swath widths, 7", 10" and 12", so that any swath width can be dispensed from one box by interchanging heads attached to the box. The box cover is one extrusion and the bottom and back are another. The hinged edge of the cover has a cylindrical segment along the edge which fits into a partial cylindrical groove in the back, providing a leak proof hinge. Channels are provided to enhance mud flow from portions of the box beyond the width of the mouth of the head being used to the portion within the mouth width.

However, these existing flat box finishers fail to provide a flat box finisher which has a unique grasping mechanism capable of quickly securing and releasing the base of a pole of the flatbox finisher which is easy to use and efficient as in the present device. A need, therefore, exists for an improved flatbox finisher with a securing mechanism for easily and quickly grasping and securing the base of a pole of the flatbox finisher.

SUMMARY OF THE INVENTION

A system and mechanism to secure the base of a pole to the lid of a flatbox finisher is provided. The mechanism utilizes at least one spring grasping device on the lid of the flat box finisher to grasp and secure the base of the pole. The grasping mechanism is depressed and grasps a generally flat rectangular edge of the base of the pole and secures the base of the pole to the lid of the flatbox finisher by friction. In particular, as the base having the pole of the flatbox finisher is first slid over the grasping mechanism, the grasping mechanism is first pushed downward. After the base slides over the grasping mechanism, the grasping mechanism springs back upward and locks the base of the pole into place on the lid of the flatbox finisher. Wing nuts may then be used to further secure the base of the pole to the lid of the flatbox finisher. An alternative embodiment, a knob located on a receiving cylinder of the lid of the flat box finisher receives a pin of the handle portion of the flat box finisher and secures the pin (and therein the handle portion) to the flat box finisher.

An advantage of the device is to provide a quick and efficient way to secure the handle portion (having a base) of a drywall finisher to a lid of the flatbox finisher.

A further advantage of the device is to provide a flatbox finisher which is resistant to damage.

And yet another advantage is to provide a flatbox finisher which may be made in almost any size.

Still another advantage of the present device is that the device may utilize an optional elevated platform to secure various flatbox finishers.

Yet another advantage of the present device is that the present device allows a user to secure or remove the handle portion of the flatbox finisher by hand and without any tools.

Still another advantage of the present device is that the handle of the flat box finisher may be secured to the lid of the flat box finisher by a knob on a receiving cylinder which receives a pin from the handle portion of the device.

For a more complete understanding of the above listed features and advantages of the flatbox finisher, reference should be made to the following detailed description of the preferred embodiments and to the accompanying drawings. Further, additional features and advantages of the invention are described in, and will be apparent from, the detailed description of the preferred embodiments and from the drawings.

BRIEF DESCRIPTION OF THE DRAWINGS

FIG. 11 illustrates a side perspective view of the flat box finisher having an alternative attachment mechanism for the handle.

FIG. 12 illustrates a cut-away view of FIG. 11.

DETAILED DESCRIPTION OF THE PREFERRED EMBODIMENTS

A system and mechanism to secure the base of a pole to the lid of a flatbox finisher is provided. The mechanism utilizes at least one spring grasping device on the lid of the flat box finisher to grasp and secure the base of the pole. The grasping mechanism is depressed and grasps a generally flat rectangular edge of the base of the pole and secures the base of the pole to the lid of the flatbox finisher by friction. In particular, as the base having the pole of the flatbox finisher is first slid over the grasping mechanism, the grasping mechanism is first pushed downward. After the base slides over the grasping mechanism, the grasping mechanism springs back upward and locks the base of the pole into place on the lid of the flatbox finisher. Wing nuts may then be used to further secure the base of the pole to the lid of the flatbox finisher. An alternative embodiment, a knob located on a receiving cylinder of the lid of the flat box finisher receives a pin of the handle portion of the flat box finisher and secures the pin (and therein the handle portion) to the flat box finisher.

Figure 1:
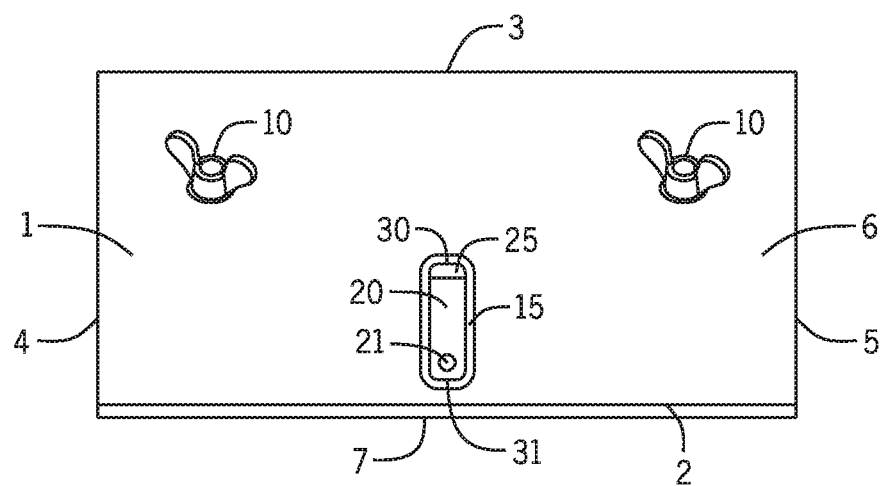
FIG. 1 illustrates a top view of the lid (or 'top') of the flatbox finisher.
Figure 2:
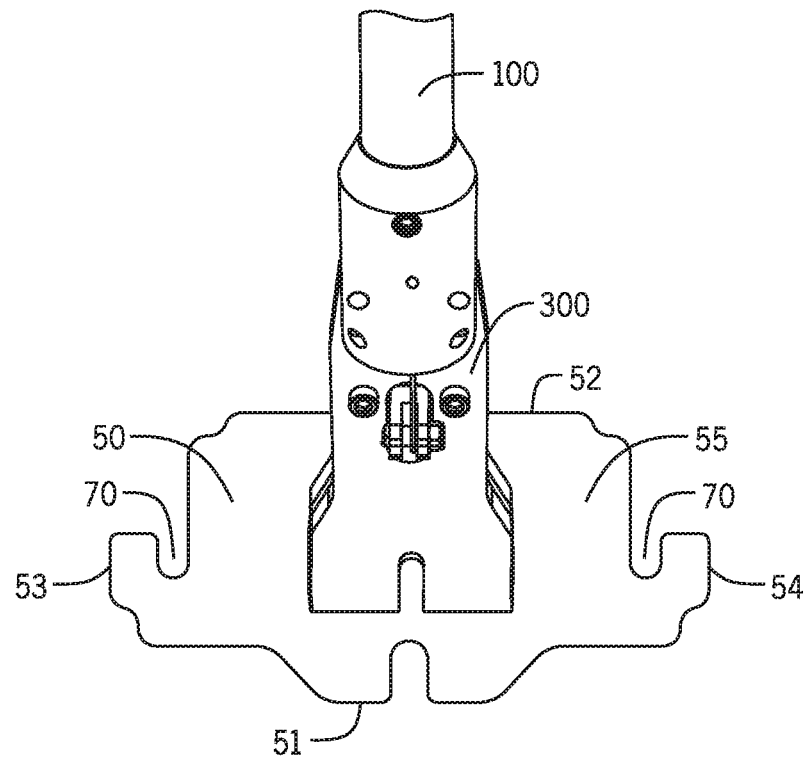
FIG. 2 illustrates a perspective view of the base of the handle portion of the flatbox finisher.
Figure 10:
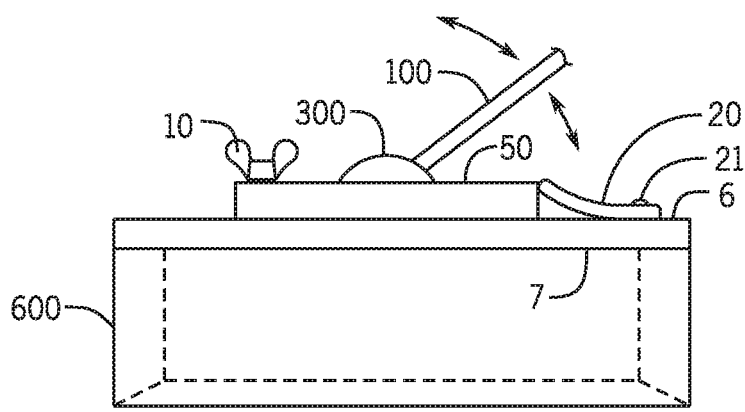
FIG. 10 illustrates a side view of the entire box of the flat box finisher secured to the handle.
Figure 13:
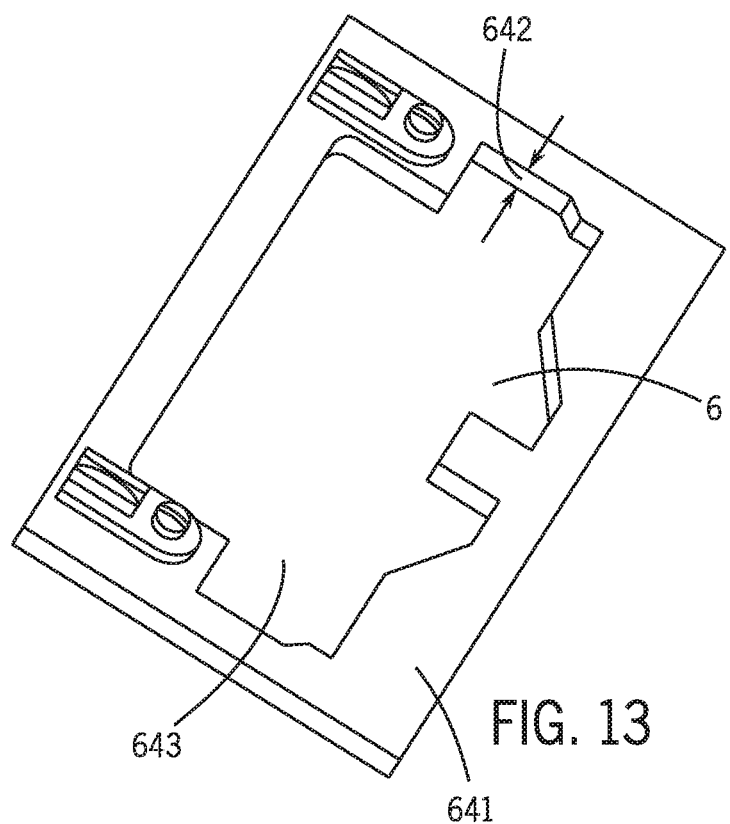
FIG. 13 illustrates an alternative embodiment of the device wherein a support base of the flat box finisher is utilized (instead of the rectangular locking mechanism) to secure the base unit and the handle portion and wherein the base unit and handle portion are currently removed from the lid.

Referring first to FIGS. 1 and 2, in an embodiment, a lid 1 of a flatbox finisher 600 (full flatbox finisher 600 shown in FIG. 10) is provided. The lid 1 of the flatbox finisher 600 may temporarily receive a base portion 50 (or base 'unit') of the flatbox finisher 600 wherein the base portion 50 is the portion of the flatbox finisher 600 in which the handle 100 is secured. The lid 1 of the flatbox finisher 600 may have a first end 2, a second end 3, a first side 4, a second side 5, a top surface 6 and a bottom surface 7.

In one embodiment, located on the top surface 6 of the lid 1 of the flatbox finisher 600 may be a first and second securing device 10. The first and second securing device 10 may be, for example, wing nuts. The first and second securing device 10 (wing nuts) allows a user to secure or remove the base portion 50 of the flatbox finisher 600 to the lid 1 of the flatbox finisher 600 by hand and without any tools. Located on the top surface 6 of the lid 1 of the flatbox finisher 600 may be, for example, a generally elongated rectangular indentation section 15. The generally elongated rectangular indentation section 15 may be recessed and may generally extend downward so as to create a slight concave portion of the top surface 6 of the lid 1 of the flatbox finisher 600. Located within the generally elongated rectangular indentation section 15 may be a generally rectangular locking mechanism 20. Further, the generally rectangular locking mechanism 20 may be located between the securing devices 10.

Figure 9:
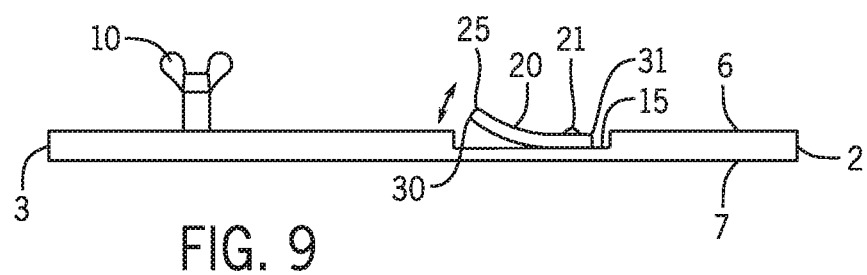
FIG. 9 illustrates a side view of an alternative embodiment of the lid of the flat box finisher.

The generally rectangular locking mechanism 20 may have a first end 30 and a second end 31. The generally rectangular locking mechanism 20 may be, for example, a thin metal strip which is spring loaded. In one embodiment, the generally rectangular locking mechanism 20 may have an upwardly extending lip portion 25 which extends above the top surface 6 of the lid 1 (see FIG. 9). The generally rectangular locking mechanism 20 may be secured within the generally elongated rectangular indentation section 15 by, for example, a single screw, bolt or the like 21 so that the first end 30 may bend upward while the second end 31 remains stationary.

Figure 5:
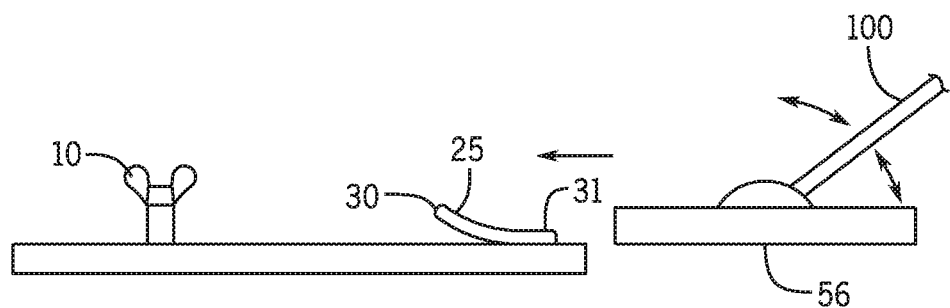
FIG. 5 illustrates a side view of the lid of the flatbox finisher wherein the base portion (having the handle) is in the process of being secured to the lid of the flatbox finisher.
Figure 6:
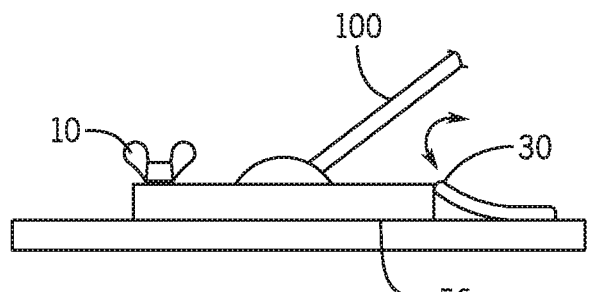
FIG. 6 illustrates a side view of the lid of the flatbox finisher wherein the base portion of the flatbox finisher is properly secured to the lid of the flatbox finisher.

Referring now to FIG. 2, in an embodiment, the base portion 50 of the handle of the flatbox finisher 600 may have a front 51, a back 52, a first side 53, a second side 54, a top 55 and a bottom 56 (FIGS. 5 and 6). Located on the first side 53 and the second side 54 of the base portion 50 may be a generally u-shaped opening 70. The generally u-shaped openings 70 of the base portion 50 may respectively receive the securing mechanism 10 of the top surface 6 of the lid 1 when the base portion 50 is secured to the lid 1.

The base portion 50 of the handle of the flatbox finisher 600 may have a head portion 300 wherein the head portion 300 may rotate with respect to the base portion 50. In particular, the head portion 300 may rotate with respect to the base portion 50 by means of a pivot rod (not shown) located within the head portion 300. As a result, a user may grasp the handle 100 and move the flatbox finisher 600 along, for example, a wall while the head portion 300 rotates with respect to the base portion 50 (which remains parallel to the wall).

Figure 3:
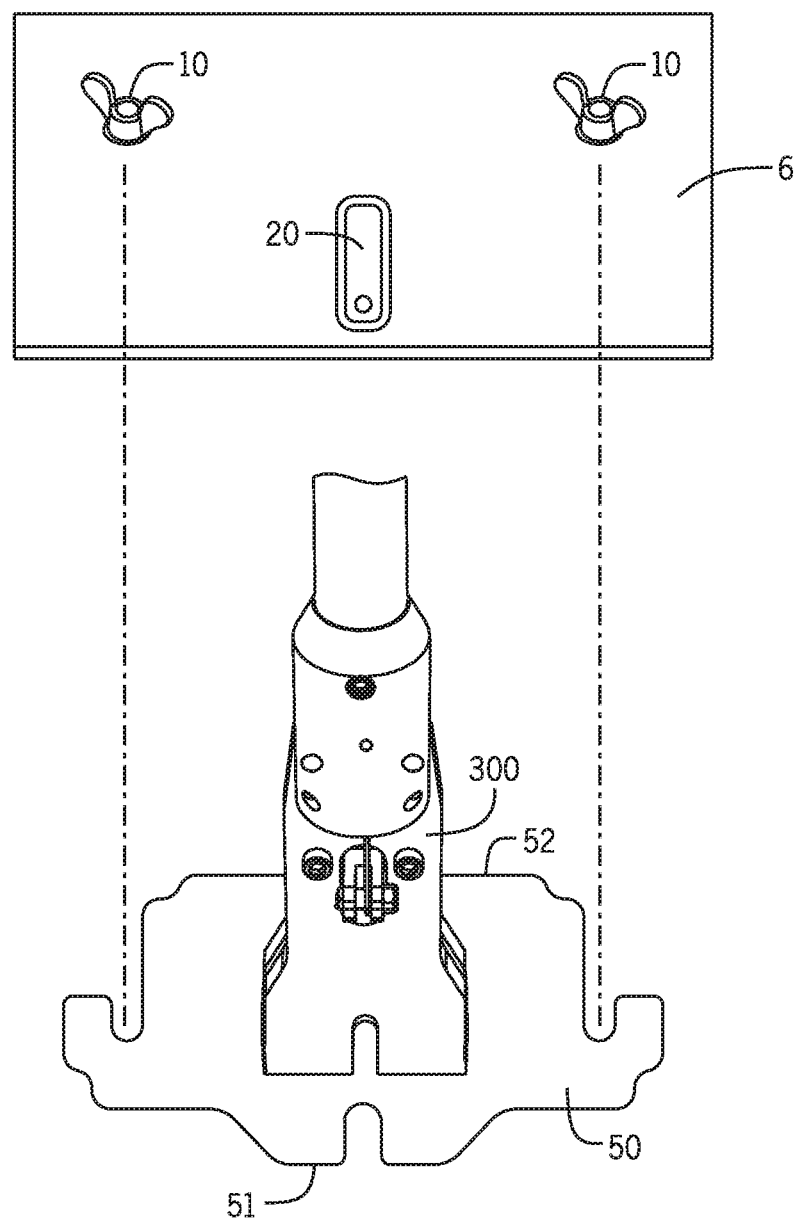
FIG. 3 illustrates a perspective view of the lid of the flatbox finisher wherein the base of the flatbox finisher handle is in the process of being secured to the lid of the flatbox finisher.
Figure 3B:
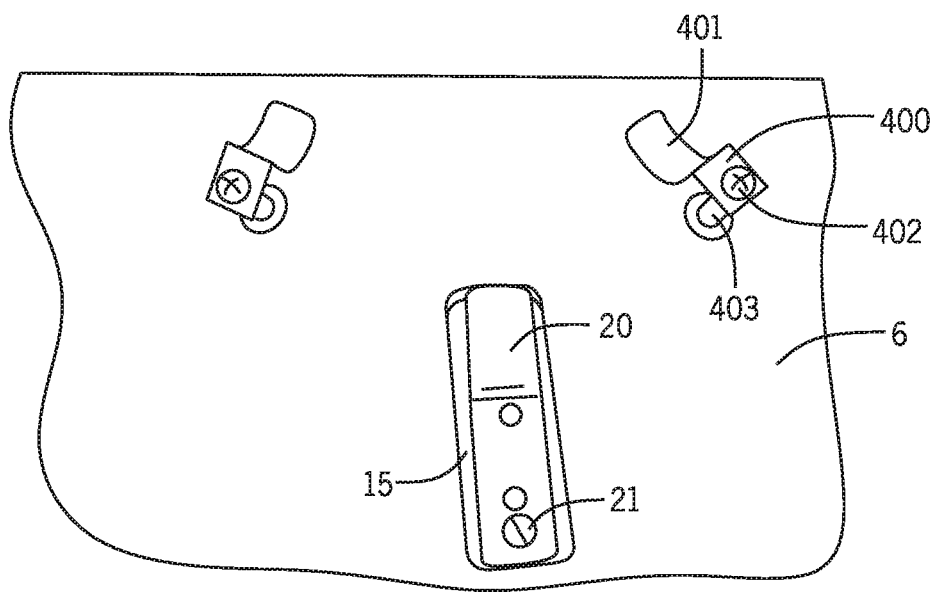
FIG. 3B illustrates a top and perspective view of the flatbox finisher wherein a spring is utilized to help secure the base portion of the flatbox finisher.
Figure 4:
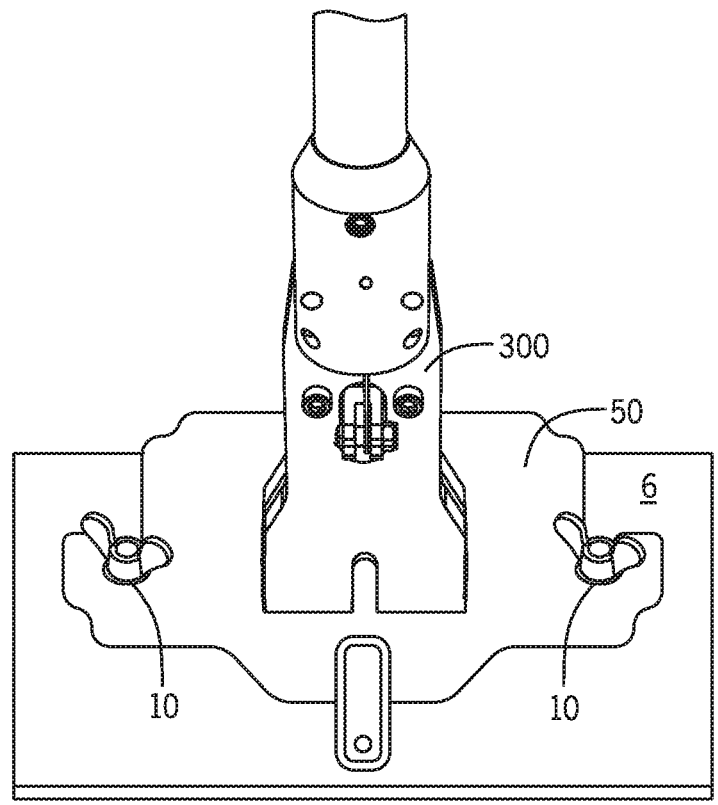
FIG. 4 illustrates a top view of the lid of the flatbox finisher wherein the base portion is properly secured.

Referring now to FIG. 3B, in an alternative embodiment, the top surface 6 of the lid of the flatbox finisher 600 may utilize a plurality of springs 400 as securing mechanism (as opposed to wing nuts 10 as illustrated in FIG. 1). The plurality of springs 400 may be secured to the top surface 6 of the lid of the flatbox finisher 600 by a pin 403 secured by a screw 402. Further, the tension applied by these plurality of springs 400 may be adjustable so as to allow a user to more quickly complete a job. The plurality of springs 400 may have a concave lower end 401 which makes direct contact with top of the base portion 50 and secures the base portion 50 (along with generally rectangular locking mechanism 20) to the top surface 6 of the lid of the flatbox finisher 600. As a result, a user may quickly attach and remove the base portion 50 without any tools and without twisting any wing nuts 10. When pressure is applied, the plurality of springs 400 (secured by the pin 403) in an embodiment allow easy removal of the base portion 50 of the device 1 from the top surface 6 of the lid 1 of the flat box finisher 600.

Figure 7:
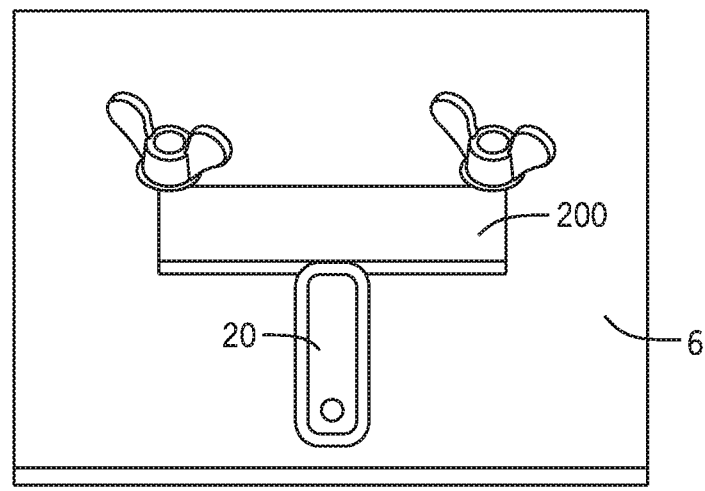
FIG. 7 illustrates an alternative embodiment of the lid of the flatbox finisher wherein an elevated platform is utilized.
Figure 8:
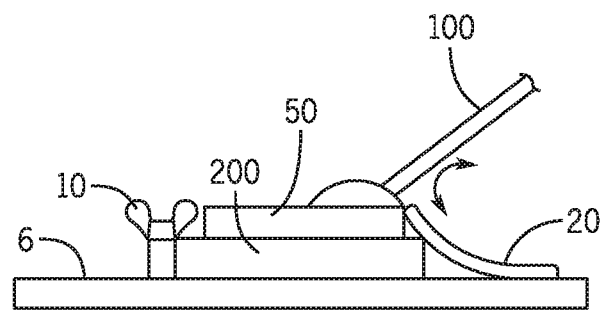
FIG. 8 illustrates an alternative embodiment of the lid of the flat box finisher wherein an elevated platform is utilized.

Referring now to FIGS. 7 and 8, in an alternative embodiment, the device may have an optional adjuster 200. The optional adjuster 200 may be generally rectangular and may be temporarily secured to the top surface 6 of the lid 1 of the flatbox finisher 600. In an alternative embodiment, the optional adjuster 200 may be permanently secured to the top surface 6 of the lid 1 of the flatbox finisher 600. The optional adjuster 200 may provide an elevated surface for receiving the base portion 50. In particular, some base portions 50 of flathbox finishers 600 may be thinner and/or smaller and therein may require the elevated surface the optional adjuster 200. When the base portion 50 is secured to the top surface 6 of the lid 1 of the flatbox finisher 600, in the embodiment utilizing the optional adjuster 200, the base portion 50 may therein primary contact the optional adjuster 200 and may not directly contact the top surface 6 of the lid 1.

To secure the base portion 50 (and thus the handle 100) to the lid 1 of the flatbox finisher 600, a user first slides the base portion 50 over the generally rectangular locking mechanism 20 until the first end 30 of the generally rectangular locking mechanism 20 grasps the front 51 of the base portion 50. The first and second securing devices 10 are moved into the u-shaped openings 70 at the same time as the generally rectangular locking mechanism 20 grasps the front 51 of the base portion 50. The first and second securing mechanisms 10 may then be tightened by, for example, twisting (the wing nuts). To remove the base portion 50 from the lid 1, the reverse process is followed (while depressing the first end 30 of the generally rectangular locking mechanism 20).

Referring now to FIGS. 11 and 12, in an alternative embodiment, the top 6 of the lid 1 of the flat box finisher 600 may have a permanently secured cylindrical receiving mechanism 480. The cylindrical receiving mechanism 480 may have a knob 405 which may be used to tighten a screw 408 extending into an opening shaft 407 of the cylindrical receiving mechanism 480. A pin 410 located on the handle portion 100 of the flat box finisher may be received by an opening shaft within the cylindrical receiving mechanism 480 and may temporarily lock the handle 100 to the lid 1 of the flat box finisher 600. When a user wishes to disengage the handle from the lid 1, a user may unscrew the knob 405 to release the pressure and the pin 410 may therein be removed along with the remaining portion of the handle 100. A pivot pin 425 may allow the handle 100 to pivot with respect to the top surface 6 of the lid 1 of the device.

Figure 14:
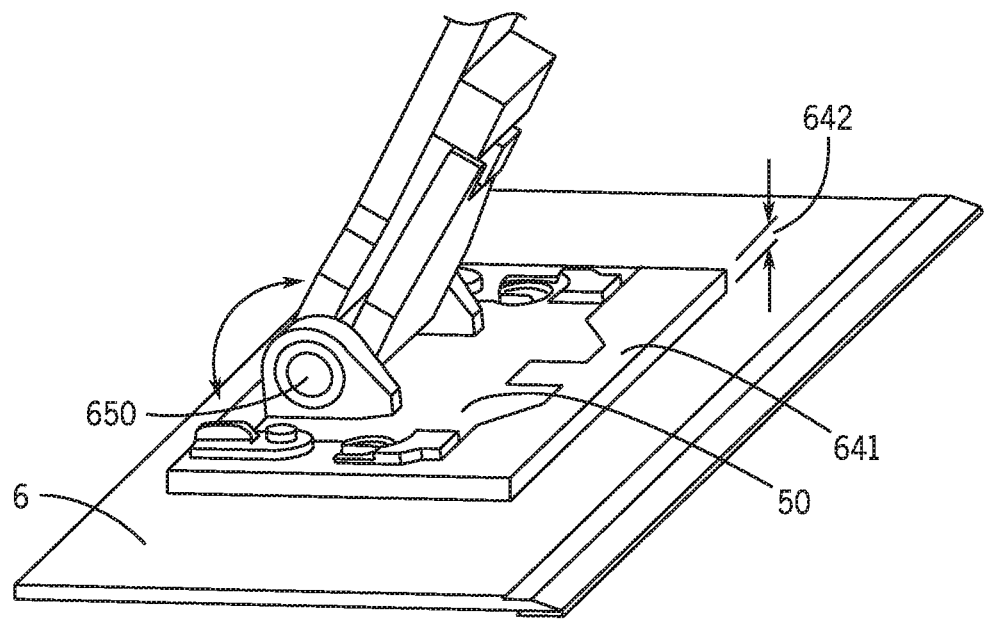
FIG. 14 illustrates the alternative embodiment of FIG. 13 wherein the base portion and the handle portion of the device are secured within the support base of the device.
Figure 15:
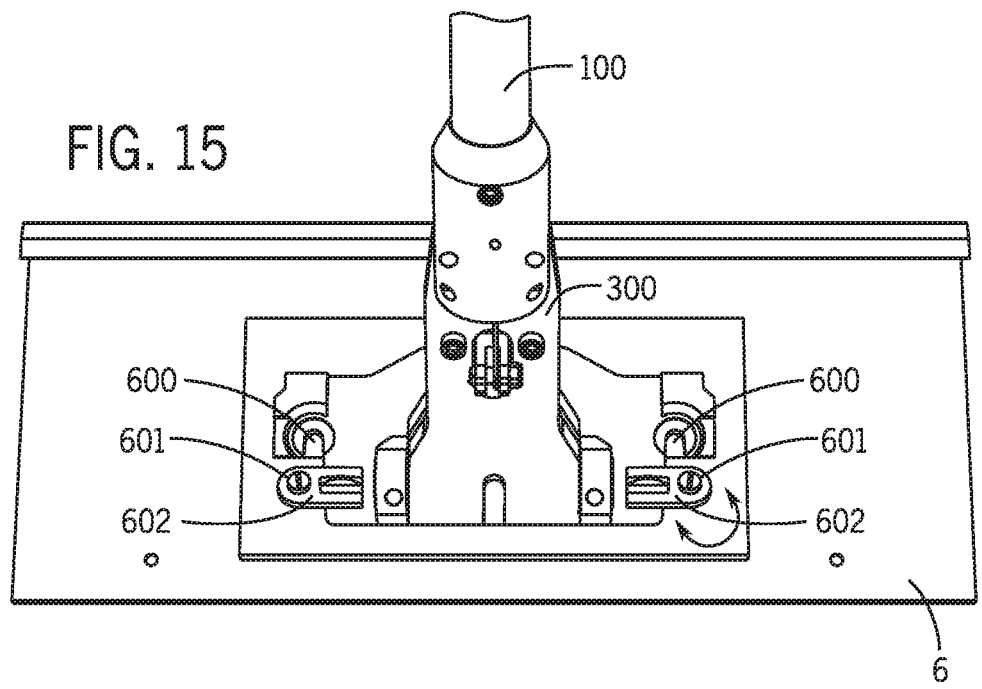
FIG. 15 illustrates a top view of the alternative attachment mechanism of the base unit and the handle portion of the flat box finisher to the lid of the flat box finisher wherein the support base is utilized and wherein the base unit and the handle portion are temporarily locked into the support base.
Figure 16:
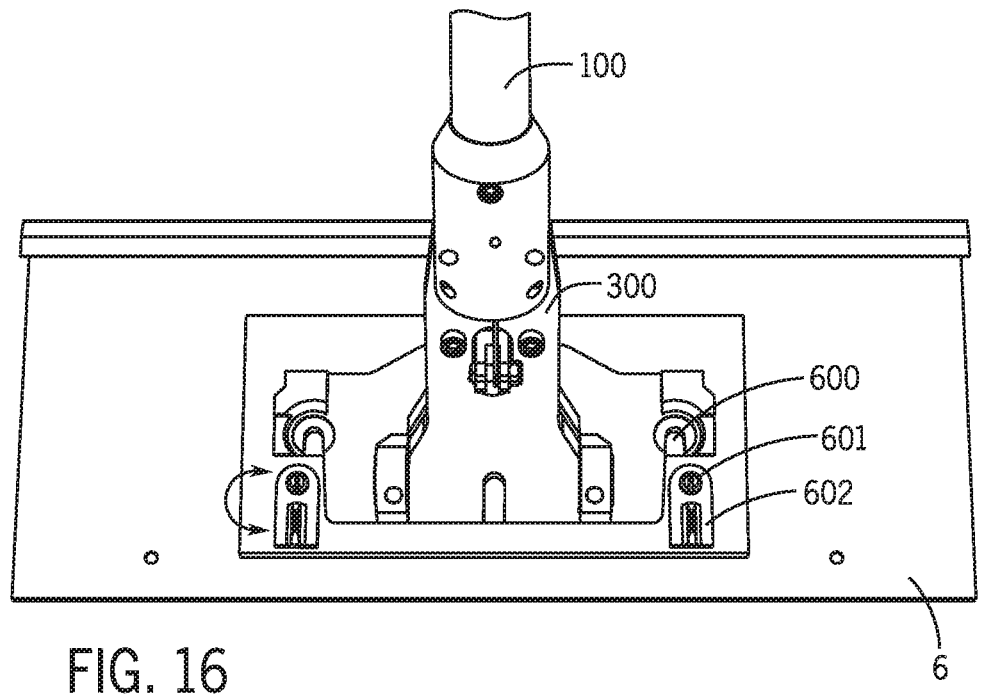
FIG. 16 illustrates a top view of the alternative attachment mechanism of the base unit and the handle portion of the flat box finisher to the lid of the flat box finisher wherein the support base is utilized and wherein the base unit and the handle portion are not yet locked into place.

Referring now to FIGS. 13-16, in yet another alternative embodiment, a support base 641 may be utilized to secure the base portion 50 (and therein handle), to the top surface 6 of the lid 1 of the device. The support base 641 may be a raised perimeter having a central opening 643 for receiving the removable base portion 50 (and wherein the base portion 50 has the general shape of the opening 643). The opening 643 may expose the top surface 6 of the lid 1 (which is located directly below the support base 641). The support base 641 may further have a height 642 substantially equal to a height of the base portion 50 so that the base portion 50 and the support base 641 remain generally flush when the base portion 50 is inserted into the opening 643 of the support base 641 (as is shown in FIG. 14). More specifically, the opening 643 may allow for the temporary securing of the base portion 50 (and thus the handle) to the top surface 6 of the lid 1. Thus, in an embodiment, the support base 641 is permanently secured to the lid 1 whereas the base portion 50 (and thus handle) portion are removable from the lid 1. More specifically, a perimeter of the base portion 50 is substantially similar to the perimeter of the opening 643 of the support base 641 so that the base portion 50 may snugly fit within the opening 643 of the support base 641 during use of the device.

In particular, a pin 601 (such as a screw) located on the top of the support base 641 may allow a rotating grasping device 602 to rotate partly over the top of the base portion 50 when the base portion 50 is inserted into the opening 643 of the support base 641 to therein secure the base portion 50 within the opening 643 in a flush manner. To remove the base portion 50 (and thus handle 100), the rotating grasping device 602 is rotated so that no portion of the rotating grasping device 602 covers any portion of the base portion 50 (see FIG. 16). Opening slots 600 of the base portion 50 may therein not be need in this embodiment. A pivot pin 650 may allow the handle 100 to rotate with respect to the base portion 50 during use.

Although embodiments of the invention are shown and described therein, it should be understood that various changes and modifications to the presently preferred embodiments will be apparent to those skilled in the art. Such changes and modifications may be made without departing from the spirit and scope of the invention and without diminishing its attendant advantages. It is, therefore, intended that such changes and modifications be covered by the appended claims.

We claim:

1. A securing mechanism for a flat box finisher comprising:
   a flat box finisher housing having a top, a bottom, a front, a back, a first side, a second side and a generally hollow interior wherein the top of the housing is a lid;
   a base unit of a handle portion wherein the base unit has a top surface, a bottom surface, a front, a back, a first side and a second side wherein the base unit is removable from the top of the housing of the flat box finisher;
   a spring loaded generally rectangular locking mechanism having a front, a back, a first side, a second side, a top and a bottom wherein only the back of the spring loaded generally rectangular locking mechanism is secured to the top of the housing of the flat box finisher wherein the spring loaded generally rectangular locking mechanism has a perimeter which is completely located within a perimeter of a generally elongated rectangular indentation of the top of the housing;
   wherein the front of the spring loaded generally rectangular locking mechanism extends upward and is not connected to the top of the housing of the flat box finisher;

a plurality of securing devices located on the top of the housing of the flat box finisher wherein the plurality of securing devices are temporarily secured within a u-shaped opening of the base unit;

wherein the spring loaded generally rectangular locking mechanism is located between at least two of the plurality of securing devices;

wherein the base unit is capable of sliding over the spring loaded generally rectangular locking mechanism and temporarily depressing the spring loaded generally rectangular locking mechanism so that the front of the spring loaded generally rectangular locking mechanism moves to a first position in contact with the top of the housing of the flat box finisher and wherein the front of the spring loaded generally rectangular locking mechanism returns to its relaxed state wherein the front of the spring loaded locking mechanism is no longer in contact with the top of the housing of the flat box finisher in a second position; and wherein the front of the spring loaded locking mechanism is in contact with the front of the base unit after the base unit completely slides over the spring loaded locking mechanism and wherein the front of the spring loaded locking mechanism and the plurality of securing devices together temporarily secure the base unit to the top of the housing of the flat box finisher.

2. The securing mechanism for a flat box finisher of claim 1 further comprising:

a pivot pin located on the base unit wherein the pivot pin allows the base unit to rotate with respect to the handle portion.

3. The securing mechanism for a flat box finisher of claim 1 wherein the back of the spring loaded generally rectangular locking mechanism is permanently located within the generally elongated rectangular indentation section and wherein the front of the spring loaded generally rectangular locking mechanism is located below the top of the flat box finisher in a first orientation and wherein the front of the spring loaded generally rectangular locking mechanism is located above the top of the flat box finisher in a second orientation and wherein the spring loaded generally rectangular locking mechanism is capable of moving between the first orientation and the second orientation.

4. The securing mechanism for a flat box finisher of claim 1 wherein the plurality of securing devices are spring loaded securing devices.

* * * * *